(12) United States Patent
Schulz et al.

(10) Patent No.: US 11,369,907 B2
(45) Date of Patent: Jun. 28, 2022

(54) FILTER CARTRIDGE AND FILTER CARTRIDGE ARRANGEMENT

(71) Applicant: Carl Freudenberg KG, Weinheim (DE)

(72) Inventors: Karsten Schulz, Neckarbischofsheim (DE); Georg Hirsch, Ubstadt-Weiher (DE); Juergen Klaus, Hemsbach (DE); Renate Tapper, Bensheim (DE)

(73) Assignee: CARL FREUDENBERG KG, Weinheim (DE)

( * ) Notice: Subject to any disclaimer, the term of this patent is extended or adjusted under 35 U.S.C. 154(b) by 337 days.

(21) Appl. No.: 15/482,864

(22) Filed: Apr. 10, 2017

(65) Prior Publication Data
US 2018/0050294 A1 Feb. 22, 2018

(30) Foreign Application Priority Data

Aug. 22, 2016 (DE) ...................... 20 2016 005 074.6

(51) Int. Cl.
*B01D 46/00* (2022.01)
*B01D 46/52* (2006.01)
*B01D 46/24* (2006.01)

(52) U.S. Cl.
CPC ..... *B01D 46/0005* (2013.01); *B01D 46/2407* (2013.01); *B01D 46/2411* (2013.01); *B01D 46/521* (2013.01)

(58) Field of Classification Search
CPC ................ B01D 46/00; B01D 46/0005; B01D 46/2407; B01D 46/2411; B01D 46/521; B01D 2201/043–0453; B01D 2201/29–298; B01D 2201/34–347; B01D 2201/605; B01D 2271/00; B01D 2275/20; B01D 2275/205; F02M 35/024–02491
USPC ....................................... 55/490–519, DIG. 3
See application file for complete search history.

(56) References Cited

U.S. PATENT DOCUMENTS

| | | | |
|---|---|---|---|
| 3,844,750 A | 10/1974 | Ray | |
| 4,138,234 A * | 2/1979 | Kubesa | B01D 46/02 55/374 |
| 4,322,231 A * | 3/1982 | Hilzendeger | B01D 46/0005 55/357 |
| 4,436,536 A | 3/1984 | Robinson | |
| 4,613,348 A * | 9/1986 | Natale | A47L 9/122 15/347 |
| 5,332,409 A * | 7/1994 | Dralle | B01D 46/0013 55/484 |
| 5,803,939 A * | 9/1998 | Huning | B01D 46/008 55/369 |
| 5,961,696 A * | 10/1999 | Gombos | B01D 46/0005 55/493 |
| 6,348,085 B1 * | 2/2002 | Tokar | B01D 46/0001 55/482 |

(Continued)

FOREIGN PATENT DOCUMENTS

EP  0610545 A1  8/1994

*Primary Examiner* — T. Bennett McKenzie
(74) *Attorney, Agent, or Firm* — Leydig, Voit & Mayer, Ltd.

(57) ABSTRACT

A filter cartridge has a filter medium that is provided at least on an end face with a flange that serves for the installation of the filter cartridge in a filter arrangement, whereby the flange has a radial flange and a support section, whereby the support section extends in the lengthwise direction of the filter cartridge.

9 Claims, 5 Drawing Sheets

(56) References Cited

U.S. PATENT DOCUMENTS

| | | | |
|---|---|---|---|
| 6,358,292 B1 * | 3/2002 | Clements | B01D 46/0005 55/379 |
| 6,398,838 B1 | 6/2002 | Kaffenberger | |
| 6,440,188 B1 * | 8/2002 | Clements | B01D 46/0005 55/378 |
| 7,294,163 B1 | 11/2007 | Lacroix | |
| 7,332,005 B2 * | 2/2008 | Wegelin | A47L 9/1481 15/314 |
| 8,580,004 B1 * | 11/2013 | Clements | B01D 46/0005 55/360 |
| 8,673,037 B2 * | 3/2014 | Morgan | B01D 46/02 55/341.1 |
| 2005/0028501 A1 * | 2/2005 | Riedel | A47L 9/1409 55/498 |
| 2008/0127832 A1 * | 6/2008 | Zhang | B01D 46/0086 96/416 |
| 2011/0162336 A1 | 7/2011 | Poulsen | |
| 2013/0091811 A1 * | 4/2013 | Morgan | B01D 46/008 55/341.1 |
| 2013/0125754 A1 * | 5/2013 | Johnson | B01D 46/04 95/280 |
| 2013/0239802 A1 * | 9/2013 | Troxell | B01D 46/0068 95/20 |
| 2014/0053521 A1 * | 2/2014 | Muenkel | B01D 46/0021 55/489 |
| 2014/0130468 A1 * | 5/2014 | Jackson | B01D 46/0005 55/482 |
| 2014/0165834 A1 * | 6/2014 | Kaufmann | F02M 35/02416 95/273 |

* cited by examiner

FILTER CARTRIDGE AND FILTER CARTRIDGE ARRANGEMENT

CROSS-REFERENCE TO RELATED APPLICATIONS

Priority is claimed to German Patent Application No. DE 20 2016 005 074.6, filed on Aug. 22, 2016, the entire disclosure of which is hereby incorporated by reference herein.

FIELD

The invention relates to a filter cartridge and a filter cartridge arrangement.

BACKGROUND

Filter cartridges are employed in many realms of technology, for example, in order to purify exhaust air and to prevent particles from getting into blowers, fans and the like. In this context, filter cartridges are inserted into a holder and affixed therein. Particularly in the case of mobile applications, for instance, in suction excavators, the filter cartridges are not installed so as to be stationary, but rather, they swivel together with the receptacle in which the filter cartridges are installed. Moreover, the filter cartridges are subject to strong vibrations in mobile applications. A problematic aspect here is that, when the holder containing the filter cartridges is swiveled, strong forces act on the flange and on the holder when the filter cartridges are swiveled from a vertical position into a horizontal position. For this reason, prior-art holders and flanges of filter cartridges have a complex structure, making it laborious to replace the filter cartridges.

SUMMARY

An aspect of the invention provides a filter cartridge, comprising: a filter medium including, at least on an end face, a flange configured to install the filter cartridge in a filter arrangement, wherein the flange includes a radial flange and a support section, and wherein the support section extends in a lengthwise direction of the filter cartridge.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
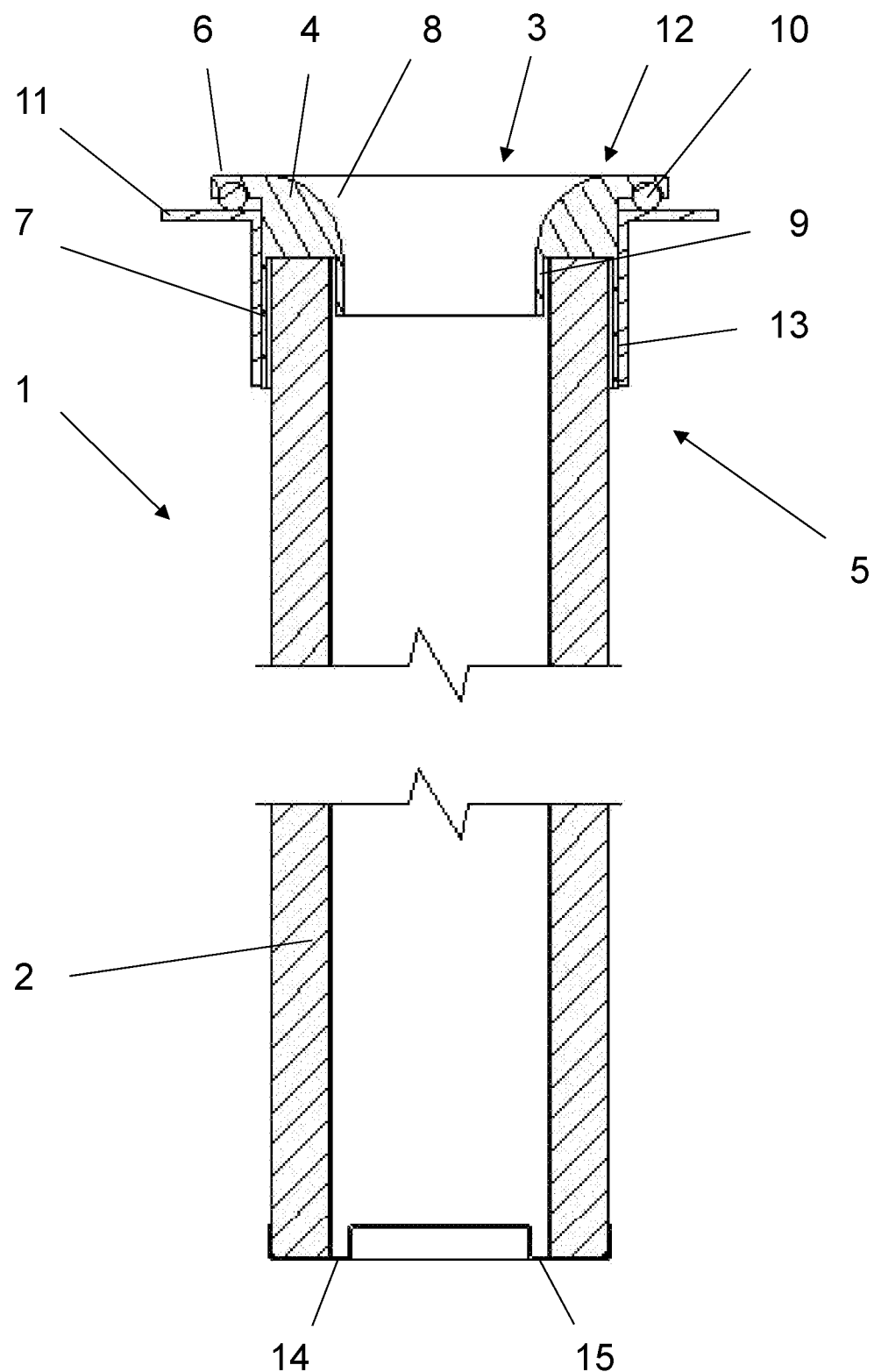
FIG. 1 a filter arrangement for a suction excavator.

An aspect of the invention relates to a filter cartridge comprising a filter medium that is provided at least on an end face with a flange that serves for the installation of the filter cartridge in a filter arrangement. An aspect of the invention also relates to a filter cartridge arrangement.

An aspect of the invention is based on the objective of putting forward a filter cartridge that is easy to install and that is moreover capable of absorbing a high bending moment.

A filter cartridge that achieves an aspect of the invention comprises a filter medium that is provided at least on an end face with a flange that serves for the installation of the filter cartridge in a filter arrangement, whereby the flange has a radial flange as well as a support section, and the support section extends in the lengthwise direction of the filter cartridge.

The radial flange of the filter cartridge forms a stop that comes to rest against the holder. The support section is inserted together with the filter cartridge into the holder and it then rests against the inner wall of the holder. Since the support section extends in the lengthwise direction of the filter cartridge, the support section absorbs bending forces that can be very strong, especially when the filter cartridge is installed horizontally. The support section also functions as a centering aid so that the filter cartridge orients itself automatically once it has been inserted completely into the holder, thus altogether facilitating the installation of the filter cartridge.

The support section is an integral part of the filter cartridge, so that the holder that receives the filter cartridge can have a very simple configuration.

A support construction located on the untreated-gas side can be dispensed with, thereby preventing the formation of dust bridges and significantly reducing the weight of the total filter unit.

Preferably, the filter medium has a cylindrical configuration. Such cylindrical filter cartridges are very easy to manufacture and have a large filter surface area.

The support section can surround the filter medium in the radial direction at a distance, at least in certain sections. This ensures that the entire surface area of the filter is available for the filtration. Moreover, the resultant larger support span translates into the ability to absorb a higher torque or greater bending forces. Preferably, however, the support section is in contact with the outer edges, for instance, with the outer pleat tips of the filter medium. This yields a particularly stable connection. The connection can also be improved if the support section is integrally bonded to the filter medium. For this purpose, an adhesive, for example, polyurethane, can be poured into the interstice between the filter medium and the flange once the flange has been installed. Thanks to the integral bond, a tilting moment inside the filter cartridge can be reliably absorbed. Moreover, this accounts for an air-tight connection between the flange and the filter medium.

Preferably, the filter medium is configured as a pleated filter. Pleated filters are compact and, at the same time, have a large filter surface area and thus a high filtering capacity. Furthermore, they have a long service life.

The flange can be provided with an inflow contoured element. This makes it possible to direct the flow into the filter cartridge in the desired manner.

In this context, the inflow contoured element can be in the form of a Venturi tube. Owing to the placement of a Venturi tube in the area of the end face, the air that is to be purified first passes through the Venturi tube before flowing into the filter cartridge itself. The Venturi tube brings about a better distribution of the air that is to be purified inside the filter cartridge, so that the filter medium is exposed uniformly.

This improves not only the filtering capacity but also the service life of the filter cartridge.

The inflow contoured element can be configured integrally with the flange, so that the filter cartridge can be produced altogether more cost-effectively.

The flange can be made of a plastic that can be injection molded. In this manner, the flange can be mass produced inexpensively.

According to a first embodiment, the support section can be configured so as to be rectangular. This configuration accounts for a particularly high bending resistance, especially parallel to the edges of the support section.

According to another embodiment, the support section has a cylindrical configuration. The advantage of this configuration is that the installation is very easy.

The outer circumference of the radial flange can be configured so as to be rectangular. This configuration is particularly advantageous when the support section is likewise rectangular.

The flange can be integrally bonded to the filter medium. This renders the filter cartridge especially stable and a very high bending load can be transmitted from the filter medium to the flange.

The flange can have an insertion section that is inserted into the interior of the filter medium. This means that the flange can be installed very easily and a high bending moment can be transmitted from the filter medium to the flange. Here, it is likewise conceivable for the flange to be held in the filter medium exclusively by means of a positive fit. However, it is likewise conceivable to employ, for instance, an adhesive, to create an integral bond in addition to the positive fit, so that the flange is connected to the filter medium in a very stable manner.

A sealing element can be associated with the radial flange. Preferably, the sealing element is integrally bonded to the radial flange. The sealing element can prevent the medium that is to be purified from getting from the untreated-gas side into the clean-air side without first passing through the filter.

FIG. 1 shows a filter arrangement 5 of a suction excavator. The filter arrangement 5 comprises several filter cartridges 1 which are inserted and affixed in a grid-like holder 11. The filter arrangement 5 is installed in the suction unit of the suction excavator so that it can be swiveled in order to allow the filter cartridges 1 to be replaced.

The holder 11 has openings 12 to receive the filter cartridges 1. The openings 12 each have an inner wall 13 that extends in the lengthwise direction of the filter cartridges 1. In this context, the filter cartridges 1 rest against the inner wall 13 of the opening 12. The holder 11 can have a flat configuration here, whereby the openings 12 are provided with collars that extend in the lengthwise direction of the filter cartridge 1. The collars can be in the form of profiles here, for instance, rectangular profiles, that are joined to the holder in the area of the openings. The insides of the rectangular profiles form the inner walls 13 of the openings 12. Particularly in the case of metal holders 11, it is conceivable for the profiles to be attached to the holder 11 by means of a welded join in the area of the openings 12.

The filter cartridges 1 are affixed in the holder 11 by means of a positive fit, whereby the holder 11 is provided with fastening means so that, in the operational state, the filter cartridges 1 are undetachably held in the holder 11 or in the filter arrangement 5.

Figure 2:
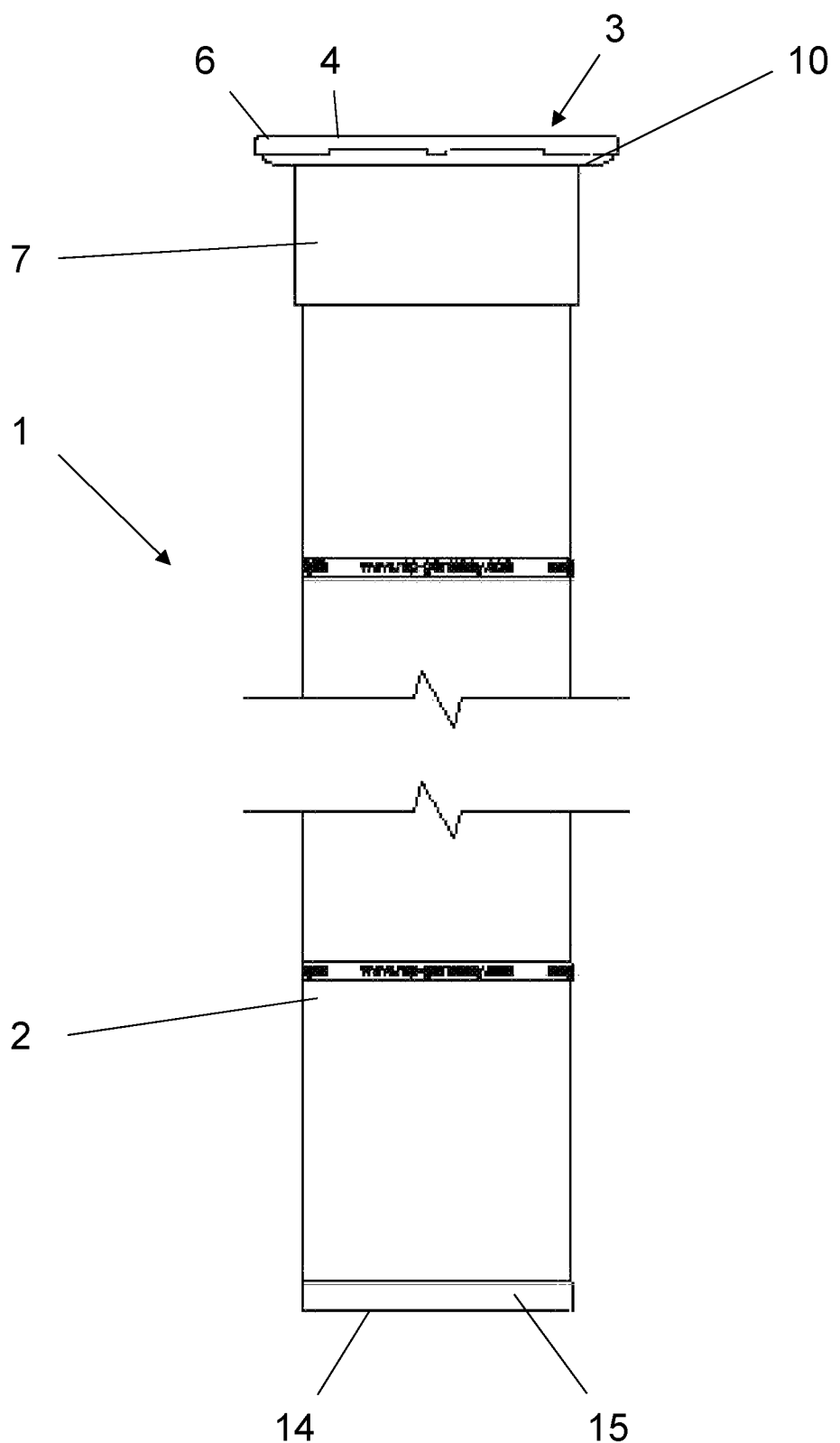
FIG. 2 a filter cartridge in a side view.

FIG. 2 shows a side view of a filter cartridge 1 for the filter arrangement 5 of a suction excavator. The filter cartridge 1 comprises a filter medium 2 made of a nonwoven that is provided on an end face 3 with a flange 4 for installing the filter cartridge 1 in the filter arrangement 5. The filter medium 2 is made of a flat material which is first pleated and subsequently imparted with a cylindrical shape. As an alternative, it is also conceivable to use filter paper as the filter medium 2. The total length of the filter cartridge 1 is 1,200 mm. A length of 750 mm to 2,000 mm for the filter cartridge 1 is conceivable. The diameter of the filter cartridge 1 is 150 mm. A diameter ranging from 100 mm to 200 mm is possible.

The filter cartridge 1 is installed in the filter arrangement 5 in such a way that the untreated gas flows in the lengthwise direction into the interior of the filter cartridge 1 and then in the radial direction through the filter medium 2 before reaching the clean-air side.

An end face of the filter medium 2 has a flange 4 for installing the filter cartridge in a filter arrangement. The flange 4 is made of a plastic that can be injection molded, and it has a radial flange 6 and a support section 7, whereby the radial flange 6 and the support section 7 have a one-piece configuration and are made of a single material. The support section 7 extends in the lengthwise direction of the filter cartridge 1 and it surrounds the filter medium 2 in the radial direction, whereby the support section 7 rests against the outer pleat tips of the filter medium 2. The interstice between the support section 7 and the filter medium 2 is at least partially filled with an adhesive, here a polyurethane. In the case of the filter cartridge 1 installed in the filter arrangement 5, the radial flange 6 rests on the holder 11 on the untreated-gas side, thereby covering the opening 12 that receives the filter cartridge 1. The opening 12 has an inner wall 13 that extends in the lengthwise direction of the filter cartridge 1. The support section 7 is configured in such a way that it rests against the inner wall 13 of the opening 12, as a result of which it absorbs torque and supports the filter cartridge 1.

The second end face 14 of the filter cartridge 1 is closed off by a cover 15.

The flange 4 is connected to the filter medium 2 by means of a positive fit. For this purpose, the flange 4 has an insertion section 9 that is inserted into the interior of the filter medium 2. In addition, an adhesive creates an integral bond between the filter medium 2 and the flange 4.

A sealing element 10 is associated with the radial flange 6. The sealing element 10 consists of a thermoplastic elastomer and it is integrally bonded to the side of the radial flange 6 associated with the holder 11. As an alternative, the sealing element 10 can also be an O-ring.

The flange 4 has a section that protrudes into the interior of the filter cartridge 1. This section is provided with an inflow contoured element 8 in the form of a Venturi tube.

The support section 7 and the radial flange 6 have a rectangular outer contoured element.

Figure 3:
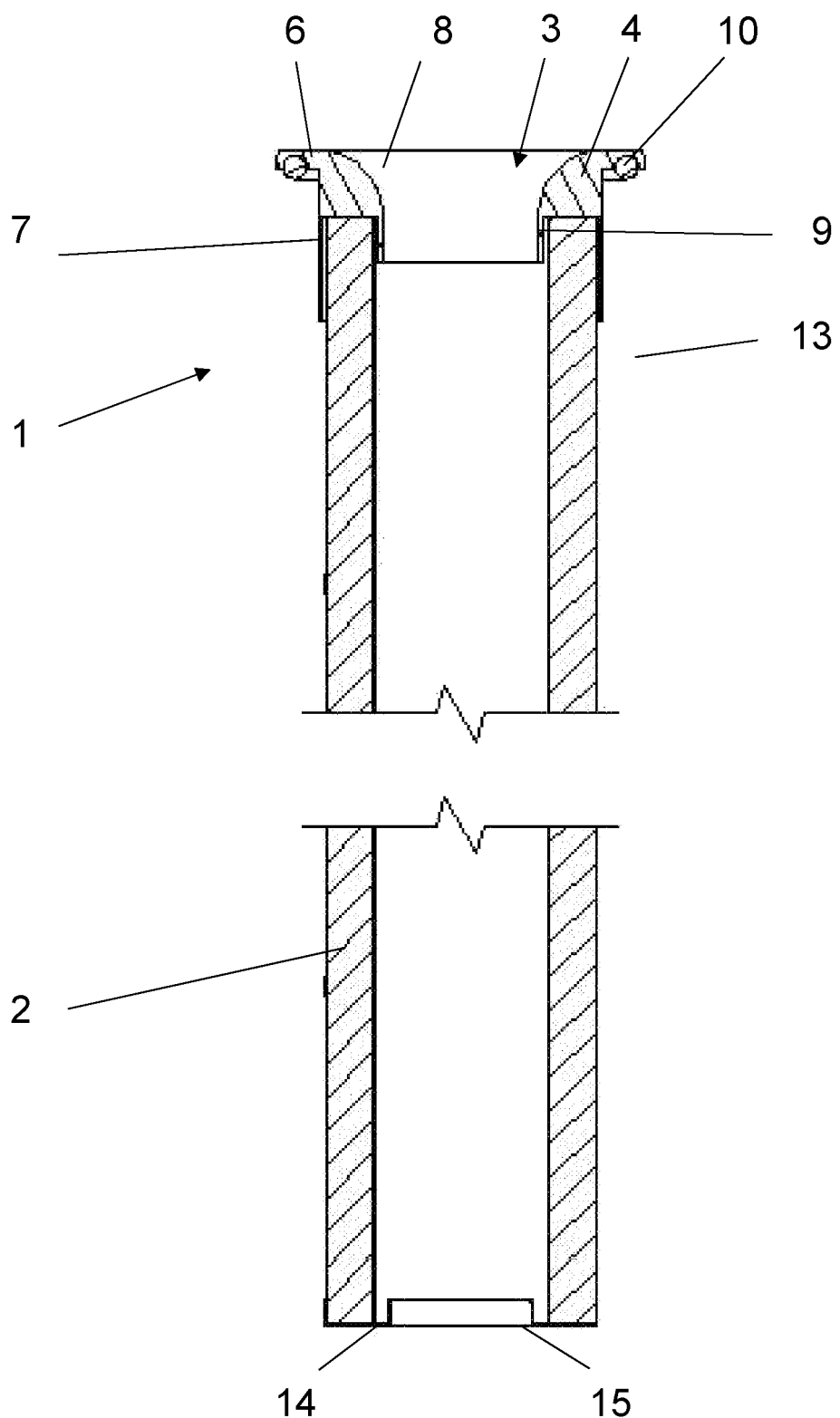
FIG. 3 a filter cartridge in a longitudinal view.
Figure 4:
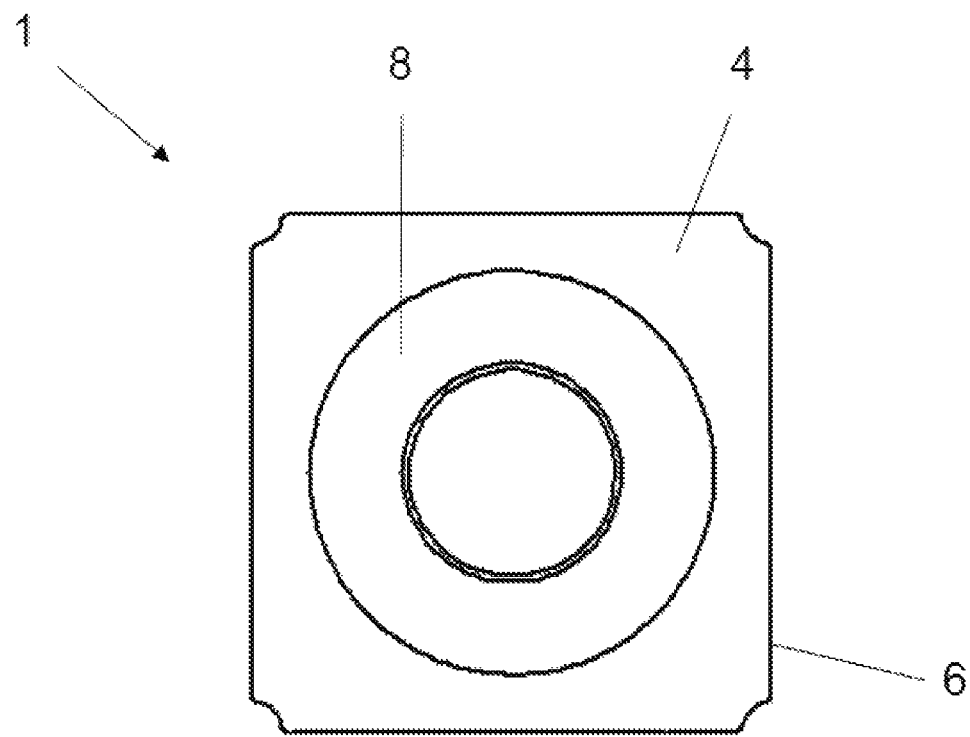
FIG. 4 a filter cartridge in a top view.
Figure 5:
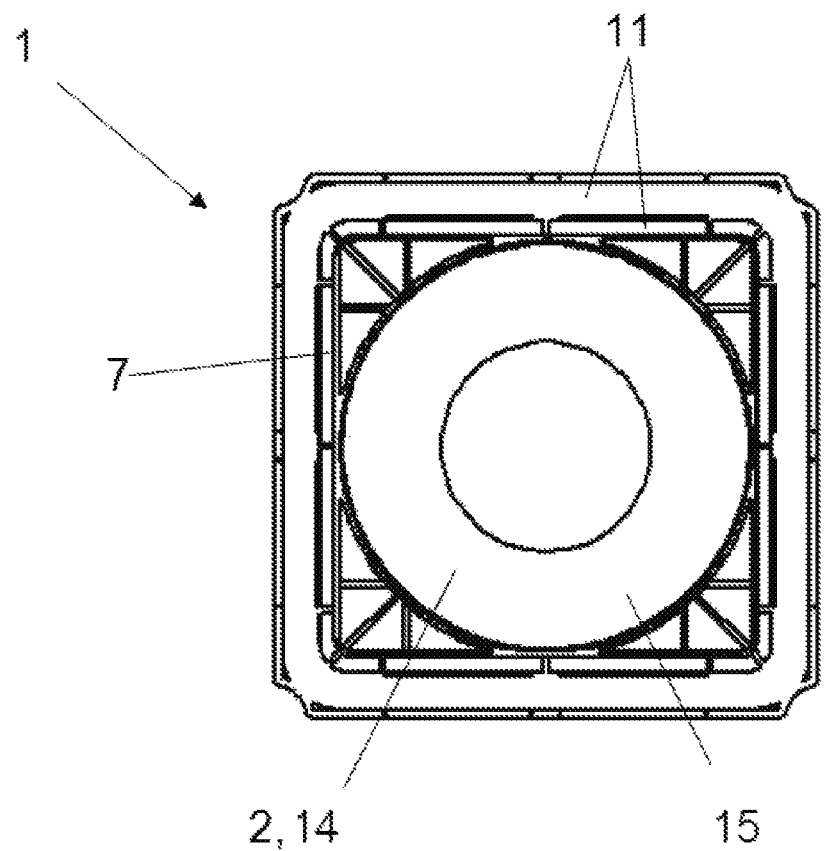
FIG. 5 a filter cartridge in a bottom view.

FIG. 3 shows a longitudinal sectional view of the filter cartridge 1 described in FIG. 2. FIG. 4 shows a top view of the filter cartridge 1 described in FIG. 2. The flange 4 with the inflow contoured element 8 in the form of a Venturi tube can be seen here. FIG. 5 shows a bottom view of the filter cartridge 1 described in FIG. 2. The cover 15 that closes off the filter medium 2 on the second end face 14 can be seen here.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A filter arrangement, comprising:
a holder including an opening including an inner wall that extends lengthwise so as to allow receiving a filter cartridge;
the filter cartridge comprising a filter medium including, at least on an end face, a flange configured to install the filter cartridge in the holder,
wherein the flange includes a radial flange and a support section,
wherein the support section extends in a lengthwise direction of the filter cartridge so as to be parallel with the filter medium, and rests against the inner wall of the opening,
wherein the support section has a rectangular outer contour when viewed from a bottom view of the filter cartridge,
wherein the radial flange, on an outer circumference, is configured so as to be rectangular, and
wherein the filter medium has a cylindrical configuration.

2. The filter arrangement of claim 1, wherein the support section surrounds the filter medium in a radial direction at a distance.

3. The filter arrangement of claim 1, wherein the filter medium is configured as a pleated filter.

4. The filter arrangement of claim 1, wherein the flange includes an inflow contoured element.

5. The filter arrangement of claim 4, wherein the inflow contoured element is in the form of a Venturi tube.

6. The filter arrangement of claim 1, wherein the flange is connected to the filter medium using a positive fit.

7. The filter arrangement of claim 6, wherein the flange includes an insertion section that is inserted into the interior of the filter medium.

8. The filter arrangement of claim 1, further comprising:
a sealing element, associated with the radial flange.

9. The filter arrangement of claim 7, wherein the support section extends farther in the lengthwise direction of the filter cartridge than the insertion section.

* * * * *